United States Patent
Salter et al.

(10) Patent No.: US 10,227,032 B2
(45) Date of Patent: Mar. 12, 2019

(54) VEHICLE HEADLAMP ALIGNMENT SYSTEM AND METHOD

(71) Applicant: Ford Global Technologies, LLC, Dearborn, MI (US)

(72) Inventors: Stuart C. Salter, White Lake, MI (US); Aaron Bradley Johnson, Allen Park, MI (US); Stephen Kenneth Helwig, Farmington Hills, MI (US); Paul Kenneth Dellock, Northville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 160 days.

(21) Appl. No.: 15/200,578

(22) Filed: Jul. 1, 2016

(65) Prior Publication Data

US 2018/0001814 A1   Jan. 4, 2018

(51) Int. Cl.
*B60Q 1/08*  (2006.01)
*B60Q 1/10*  (2006.01)
*B60Q 1/068*  (2006.01)
*B60Q 11/00*  (2006.01)
*B60R 11/04*  (2006.01)
*G01M 11/06*  (2006.01)

(52) U.S. Cl.
CPC ............. *B60Q 1/085* (2013.01); *B60Q 1/068* (2013.01); *B60Q 1/10* (2013.01); *B60Q 11/00* (2013.01); *B60R 11/04* (2013.01); *G01M 11/06* (2013.01)

(58) Field of Classification Search
CPC . B60Q 1/10; B60Q 1/143; B60Q 1/04; B60Q 1/08; B60Q 1/085; B60Q 2200/38; B60Q 2300/112; B60Q 2300/114; B60Q 2300/132; B60Q 2300/23; B60Q 2300/41; B60Q 2300/42; B60Q 2300/45; B60Q 2400/50
USPC ................................... 362/459–549
See application file for complete search history.

(56) References Cited

U.S. PATENT DOCUMENTS

| | | | |
|---|---|---|---|
| 4,973,155 A * | 11/1990 | Masuda | G01M 11/064 362/466 |
| 5,331,393 A | 7/1994 | Hopkins et al. | |
| 7,985,010 B2 | 7/2011 | Kamioka et al. | |
| 8,582,091 B2 | 11/2013 | Ekladyous et al. | |
| 2009/0043458 A1 | 2/2009 | Kamioka et al. | |
| 2013/0058111 A1 | 3/2013 | Ekladyous et al. | |
| 2014/0091709 A1 | 4/2014 | Choi | |
| 2014/0301094 A1* | 10/2014 | Ehlgen | B60Q 1/115 362/466 |

FOREIGN PATENT DOCUMENTS

| | | |
|---|---|---|
| DE | 102005040980 A1 | 3/2007 |
| DE | 102008029159 A1 | 12/2009 |

(Continued)

*Primary Examiner* — William J Carter
(74) *Attorney, Agent, or Firm* — Vichit Chea; Price Heneveld LLP

(57) ABSTRACT

A vehicle headlamp alignment system is provided that includes a headlamp located on a vehicle, an adjuster module for adjusting aim of the headlamp, and a camera located on the vehicle. Sensors may determine distance and orientation of the vehicle relative to a wall. A controller processes images of a beam on the wall acquired by the camera and determines the aim of the headlamp based on the images. The controller controls the adjuster module to align the headlamp based on the determined aim.

18 Claims, 5 Drawing Sheets

(56) References Cited

FOREIGN PATENT DOCUMENTS

| | | | |
|---|---|---|---|
| EP | 1640700 | A1 | 3/2006 |
| EP | 1974864 | A1 | 10/2008 |
| JP | 2014237396 | A | 12/2014 |

* cited by examiner

VEHICLE HEADLAMP ALIGNMENT SYSTEM AND METHOD

FIELD OF THE INVENTION

The present invention generally relates to vehicle headlamp assemblies, and more particularly relates to vehicle headlamp alignment.

BACKGROUND OF THE INVENTION

Automotive vehicles are typically equipped with headlamp assemblies for providing illumination of the roadway forward of the vehicle. The vehicle headlamp assemblies are typically aligned with orientation settings within an allowable tolerance range at the vehicle assembly plant or at a dealership or repair shop. The headlamp alignment may include adjusting the headlamp(s) orientation both vertically and horizontally. When the headlamp assemblies are out of alignment, manual adjusters are typically actuated to adjust the vertical and horizontal positioning of the headlamp assembly. It is desirable to provide for an enhanced vehicle headlamp alignment system and method that allows for easy alignment of the vehicle headlamps.

SUMMARY OF THE INVENTION

According to one aspect of the present invention, a vehicle headlamp alignment system is provided. The vehicle headlamp alignment system includes a headlamp located on a vehicle, an adjuster module for adjusting aim of the headlamp, and a camera located on the vehicle. The vehicle headlamp alignment system also includes a controller processing images acquired by the camera and determining the aim of the headlamp based on the images, wherein the controller controls the adjuster module to align the headlamp based on the determined aim.

According to another aspect of the present invention, a vehicle headlamp alignment system. The vehicle headlamp alignment system includes a headlamp located on a vehicle, an adjuster module for adjusting aim of the headlamp, and a camera. The vehicle headlamp alignment system also includes a controller processing images of a headlamp beam projected onto a surface acquired by the camera and determining the aim of the headlamp based on the images, wherein the controller controls the adjuster module to align the headlamp based on the determined aim.

According to a further aspect of the present invention, a method of adjusting a vehicle headlamp is provided. The method includes the steps of aligning a vehicle with a surface so that the vehicle headlamp projects a beam onto the surface, acquiring images of the beam illuminating on the surface with the use of a camera, determining aim of the beam is and adjusting the headlamp based on the determined aim.

These and other aspects, objects, and features of the present invention will be understood and appreciated by those skilled in the art upon studying the following specification, claims, and appended drawings.

DETAILED DESCRIPTION OF THE PREFERRED EMBODIMENTS

Figure 1:
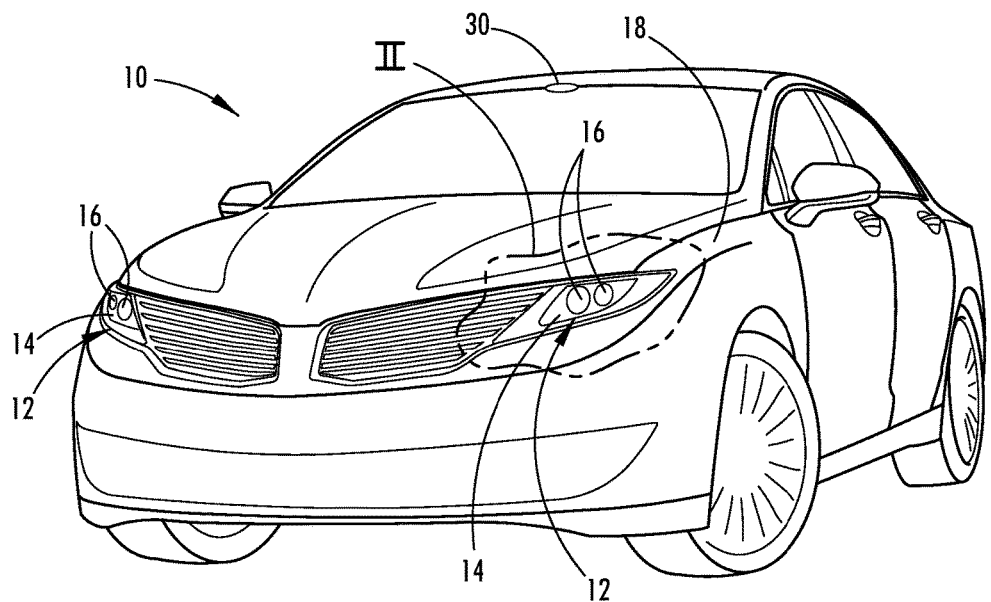
FIG. 1 is a front view of an automotive vehicle having a vehicle headlamp alignment system for aligning the vehicle headlamp assemblies.

Referring to FIG. 1, an automotive wheeled vehicle 10 is generally illustrated having a pair of front headlamp assemblies 12 located on opposite left and right front sides of the vehicle body 18. Each headlamp assembly 12 generally includes a housing 14 which may include a lens encasing one or more light sources that serve as headlamps 16 to generate headlamp beams that project forward of the vehicle 10. The headlamp assemblies 12 may generate high and low light beams and may include other lights such as turn signals, fog lamps, etc. Each headlamp assembly 12 includes an adjuster module that is actuatable to adjust and align the headlamp 16 to generate a headlamp beam aimed or pointed in a desired orientation or direction. To achieve proper headlamp alignment, a vehicle headlamp alignment system may be employed as shown and described herein, according to one embodiment.

Figure 2:
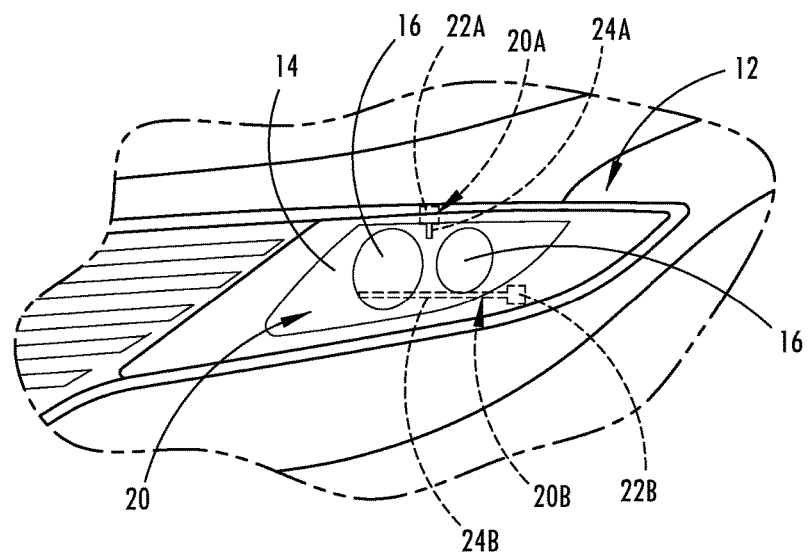
FIG. 2 is an enlarged view of one headlamp assembly generally illustrating the adjuster drive module, according to one embodiment.

The headlamp assembly 12 is further illustrated in FIG. 2 generally having the housing 14 with the various components including a pair of headlamps 16 and any optics, e.g., reflectors, lenses, etc., installed therein. The headlamp assembly 12 includes an adjuster drive module 20 for adjusting the aim of the headlamps 16 and thus aim of the generated headlamp beam. The adjuster module 20 may include a first actuator 20A for adjusting the vertical aim of the headlamps 16 and a second actuator 20B for adjusting the horizontal aim of the headlamps 16. Each of the first and second actuators 20A and 20B may include a motor 22A or 22B coupled to a drive shaft 24A or 24B. In response to receiving an input signal, one or both motors 22A and 22B may drive the corresponding drive shafts 24A and 24B to cause one or both of the first and second actuators 20A and 20B to adjust the aim of the headlamps 16. The aim of the headlamps 16 may be changed by moving the aim direction of each headlamp 16 or an assembly connected to or otherwise supporting the headlamp 16. This may include moving the light sources or optics operatively coupled thereto. It should be appreciated that the headlamp assembly 12 may include a single actuator for adjusting the headlamp aim in one direction such as the vertical direction or may include more than one actuator for adjusting the headlamp aim in multiple directions such as both horizontal and vertical directions as described herein.

Figure 3:
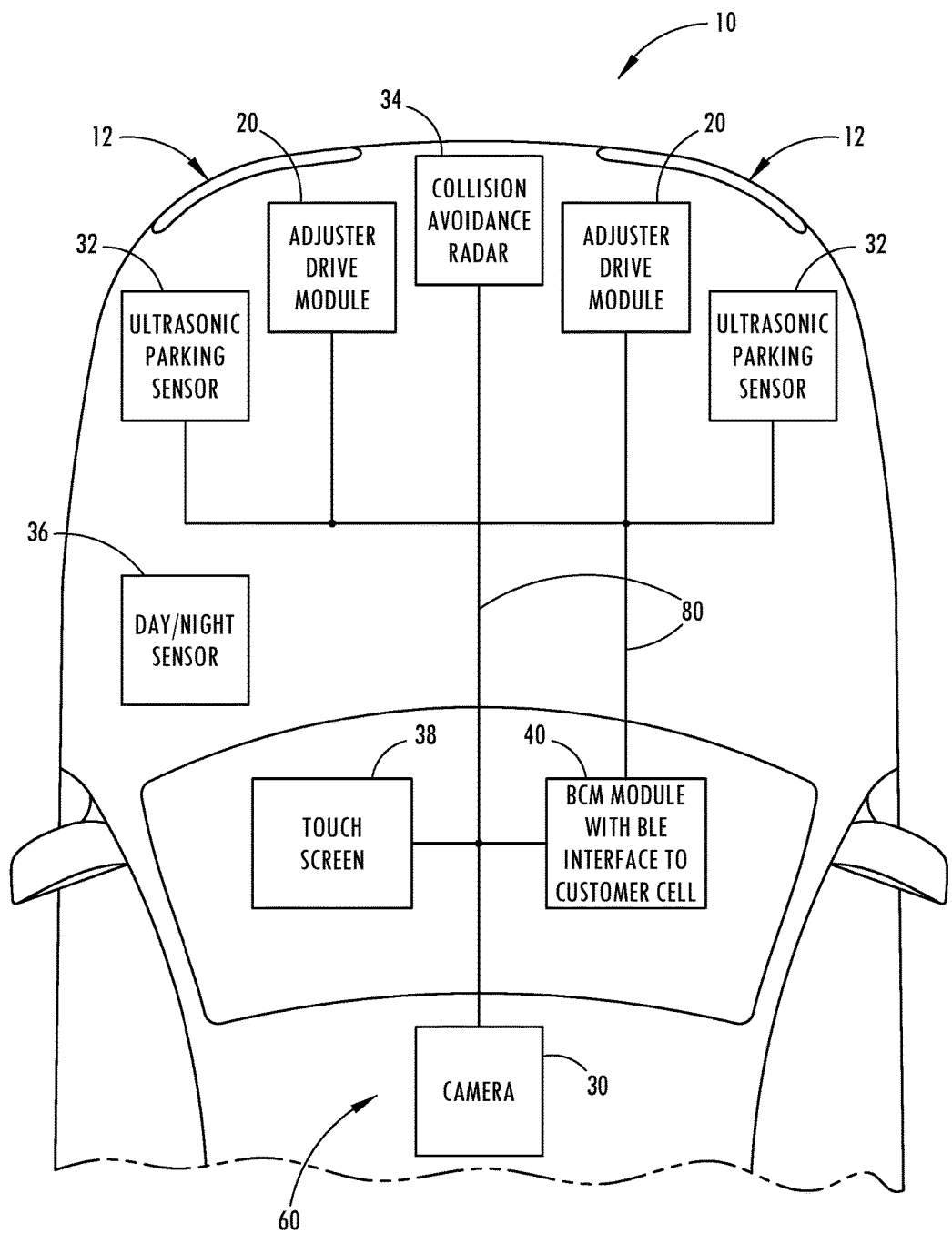
FIG. 3 is a top partial view of the vehicle illustrating in blocks various components of the vehicle headlamp alignment system.
Figure 7:
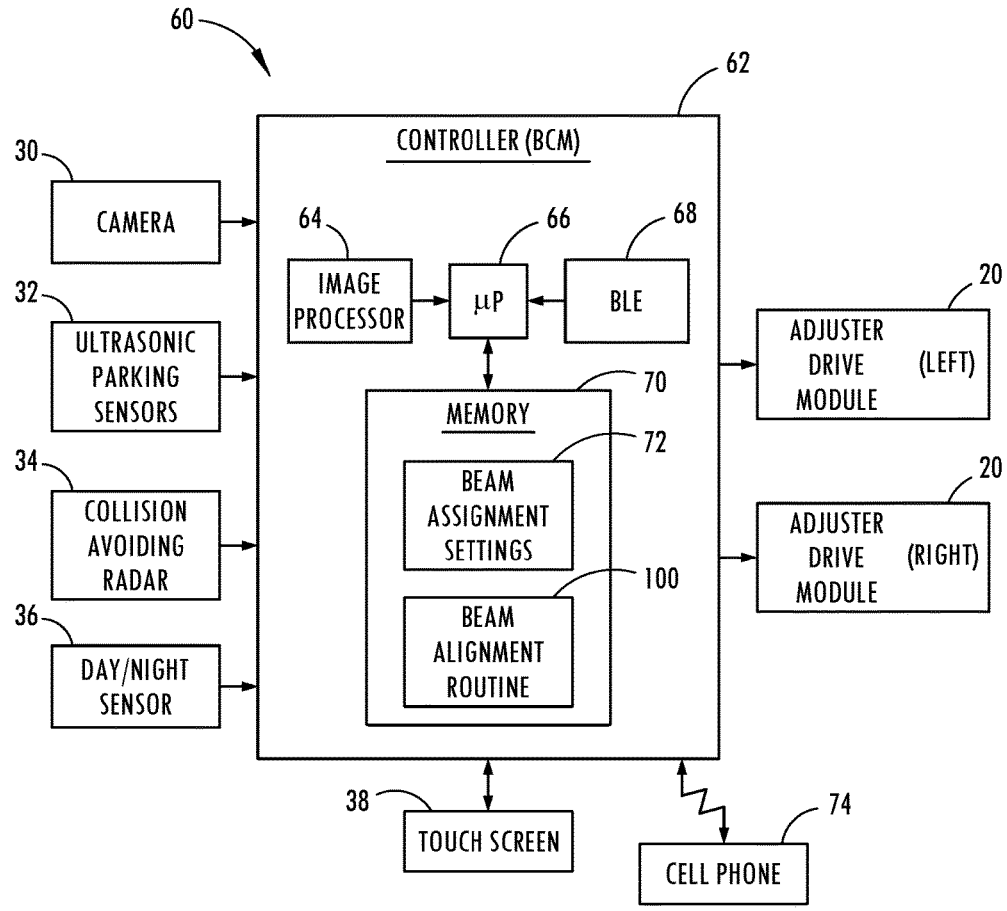
FIG. 7 is a block diagram further illustrating the vehicle headlamp alignment system.

The vehicle headlamp alignment system 60 is shown in FIGS. 3 and 7 generally having various components shown in blocks. In the embodiment shown in FIG. 3, the various components of system 60 are shown located on the vehicle 10 and communicating on a communication bus 80. The vehicle headlamp alignment system 60 employs ultrasonic parking sensors 32 shown located on left and right sides of the vehicle 10 near the front side of the vehicle 10. The ultrasonic sensors 32 are generally forward facing and may detect the distance from the headlamp assembly 12 at the front end of the vehicle 10 to a surface such as a vertical wall forward of the vehicle 10. In addition, the collision avoidance radar 34 is shown located on the front side of the vehicle 10. Each of the ultrasonic parking sensors 32 and collision avoidance radar 34 may generate a signal that is used to determine a distance from the front of the vehicle 10 to a surface forward of the vehicle. In conjunction with the vehicle headlamp alignment system 60, the ultrasonic parking sensors 32 and collision avoidance radar 34 may detect the distance from the front of the vehicle 10 to a vertical wall forward of the vehicle to determine if the vehicle 10 is within a desired distance from the wall and if the vehicle is aligned substantially perpendicular to the wall. To perform a vehicle headlamp alignment, the system 60 may require the distance between the vehicle and the wall is in the range of 15 to 30 feet and the angle between the longitudinal axis of the vehicle and the plane defined by the wall is in the range of 85° to 95°, such that the vehicle is substantially perpendicular to the wall, according to an exemplary embodiment. In addition, the vehicle 10 is shown having a day/night sensor 36 for detecting dark or light conditions in the ambient environment in which the vehicle 10 is located. By knowing if the vehicle 10 is in a dark condition, the vehicle headlamp alignment system 60 may better acquire and process the light beam image generated by the headlamp 16 on the wall to perform the headlamp alignment.

In addition, a touch screen 38 is shown located on the vehicle 10 to allow a user such as a vehicle operator or technician to enter inputs and receive outputs. A body control module (BCM) 40 is also shown coupled to the communication bus 80 with Bluetooth low energy (BLE) interface to communicate with a customer cell phone or other wireless device. The BCM module 40 shown having Bluetooth low energy (BLE) allows wireless interfacing with remote devices such as a cell phone which can be used to enter inputs and receive outputs. The BCM module 40 allows communication with a user's portable device, such as a cell phone to input and output commands or messages. Further, the vehicle 10 is equipped with a forward facing imaging camera 30 which may be located behind the vehicle windshield near the top portion forward of a rearward mirror assembly, according to one embodiment. The camera 30 is oriented to capture images forward of the vehicle 10 generally in front of the vehicle 10 where the headlamp beams illuminate onto the wall. The camera 30 may be a shared camera that is used for collision detection and/or headlamp beam control. The camera 30 may be located at other locations onboard the vehicle or off the vehicle such as above the vehicle in an assembly plant, according to other embodiments. The camera 30 is used by the vehicle headlamp alignment system 60 to capture images of the headlamp beams projected onto a wall generally forward of the vehicle 10 to determine the aim of the headlamp 16. The vehicle headlamp alignment system 60 may process the captured images containing the headlamp beams projected onto the wall to determine the current aim of the headlamps during the alignment process.

Figure 4:
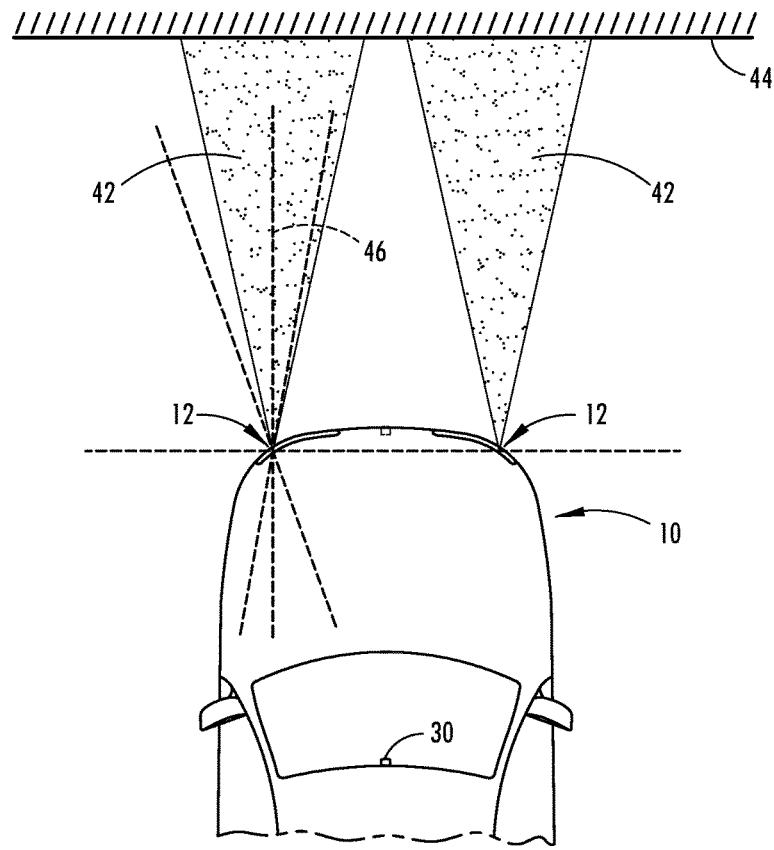
FIG. 4 is a top front view of the vehicle aligned with a wall to perform a vehicle headlamp alignment.
Figure 5:
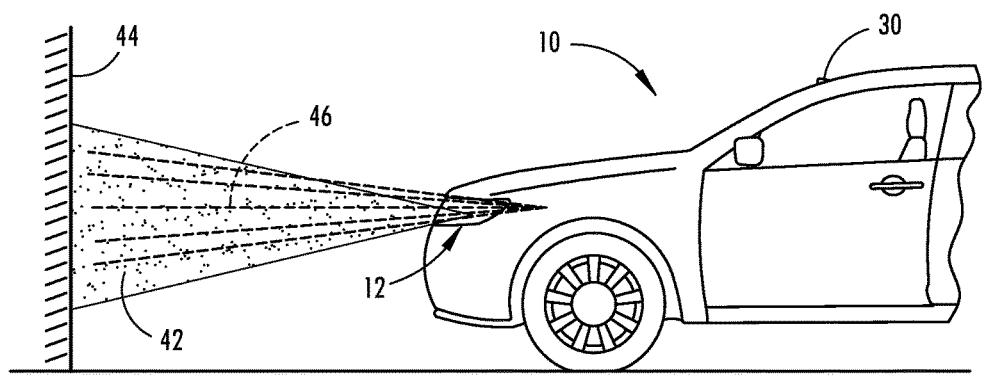
FIG. 5 is a side front view of the vehicle illuminating light on the wall during the vehicle headlamp alignment beam.
Figure 6:
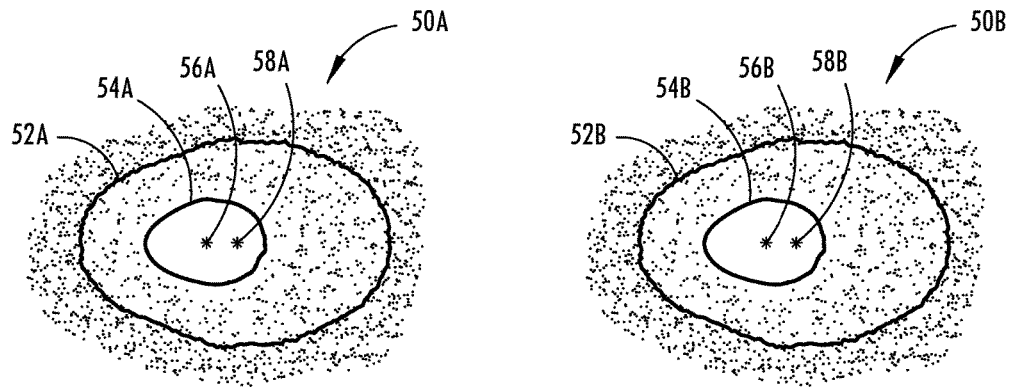
FIG. 6 is an image captured by the vehicle camera illustrating the positioning of the headlamp on the wall during the alignment.

The headlamp alignment process is illustrated in FIGS. 4-6, according to one embodiment. In FIG. 4, the vehicle 10 is generally shown aligned perpendicular to the surface on a vertical upstanding wall 44 generally forward of the vehicle 10. The wall 40 may be a building wall such as a garage wall that allows convenient beam illumination to aid in the headlamp beam alignment. It should be appreciated that the radar and ultrasonic sensors may detect the distance between the front of the vehicle 10 and the wall 44 and may detect whether the vehicle 10 is oriented or pointed in a direction substantially perpendicular to the wall 44 when the ultrasonic sensors sense a distance measurement on left and right sides that is substantially the same distance. The left and right headlamp assemblies 12 are shown generating headlamp beams 42 generally forward of the vehicle projecting generally perpendicular onto wall 44. Each of the headlamp beams 42 is generally focused about a beam axis 46. The beam axis 46 as shown in FIG. 4 may be moved horizontally left or right at an angle by employing the horizontal actuator of the adjuster module to establish the horizontal aim of the headlamp 42. As seen in FIG. 5, the beam axis 46 may be adjusted vertically up or down by employing the vertical actuator of the adjuster module so as to establish the vertical aim of the headlamp 42.

During the headlamp alignment process, the camera 30 which may be located on the vehicle 10 captures images of the headlamp beams projected forward onto the surface of wall 44 as seen in FIG. 6, according to one example. In this example, each of the headlamp beams on the left and the right sides represented by 50A and 50B, respectively, are generated by the left and right headlamp assemblies 20, respectively. Each beam illuminates a roughly circular pattern on the wall 44 and in the example shown generates an outer generally circular halo pattern 52A and 52B and a generally ring-shaped inner pattern 54A and 54B. The outer pattern 52A has a centroid 58A or 58B, while the inner beam pattern has an inner centroid 56A or 56B. The captured images may be processed by an image processor to determine the centroid positions of the inner and outer patterns which may be used to determine the aim of the headlamp and its generated beam direction. The directional aim of the beam may be determined by processing either or both of the inner centroid 56A and 56B and the outer centroid 58A and 58B. The directional aim may be computed based on the position of the camera 30 and the distance between the vehicle and the wall based on the triangulation. It should be appreciated that the captured images of the headlamp beams may otherwise be processed to determine beam aim. The determined aim of the headlamp may be compared to acceptable beam aim tolerances or user selectable directions and used to adjust the aim of the headlamp.

Referring to FIG. 7, the vehicle headlamp alignment system 60 is further illustrated in a block diagram having a controller 62 for controlling the beam alignment process. The controller 62 may include an image processor 64 for processing the video images captured with the camera 30. In addition, controller 62 may have a microprocessor 66 or other control circuitry and a BLE module 68. It should be appreciated that the image processor 64, microprocessor 66 and BLE 68 may all be part of a shared controller or control circuitry or may be separate control circuits that are part of a dedicated or shared control system. Further, controller 60 includes memory 70 which is shown including a beam alignment routine 100 and containing beam alignment settings 72. The microprocessor 66 may process the beam alignment routine 100 and may store the beam alignment settings 72 in memory 70. The controller 60 receives the day/night sensor input 36, video images from the camera 30, signals from the ultrasonic parking sensors 32 and signals from the collision avoiding radar 34, and process the various inputs. In addition, the controller 62 interfaces with the touch screen 38 and may communicate remotely with a cell phone 74 using Bluetooth or other wireless communication. The remote device such as a cell phone may allow a user to input alignment commands to initiate or steps of the alignment process and/or to input alignment settings and receive outputs. Controller 60 processes the beam alignment routine 100 and generates headlamp assembly alignment command signals for the adjuster drive modules 20 to adjust the orientation of the headlamp to move the headlamp beams left or right or up or down.

Figure 8:
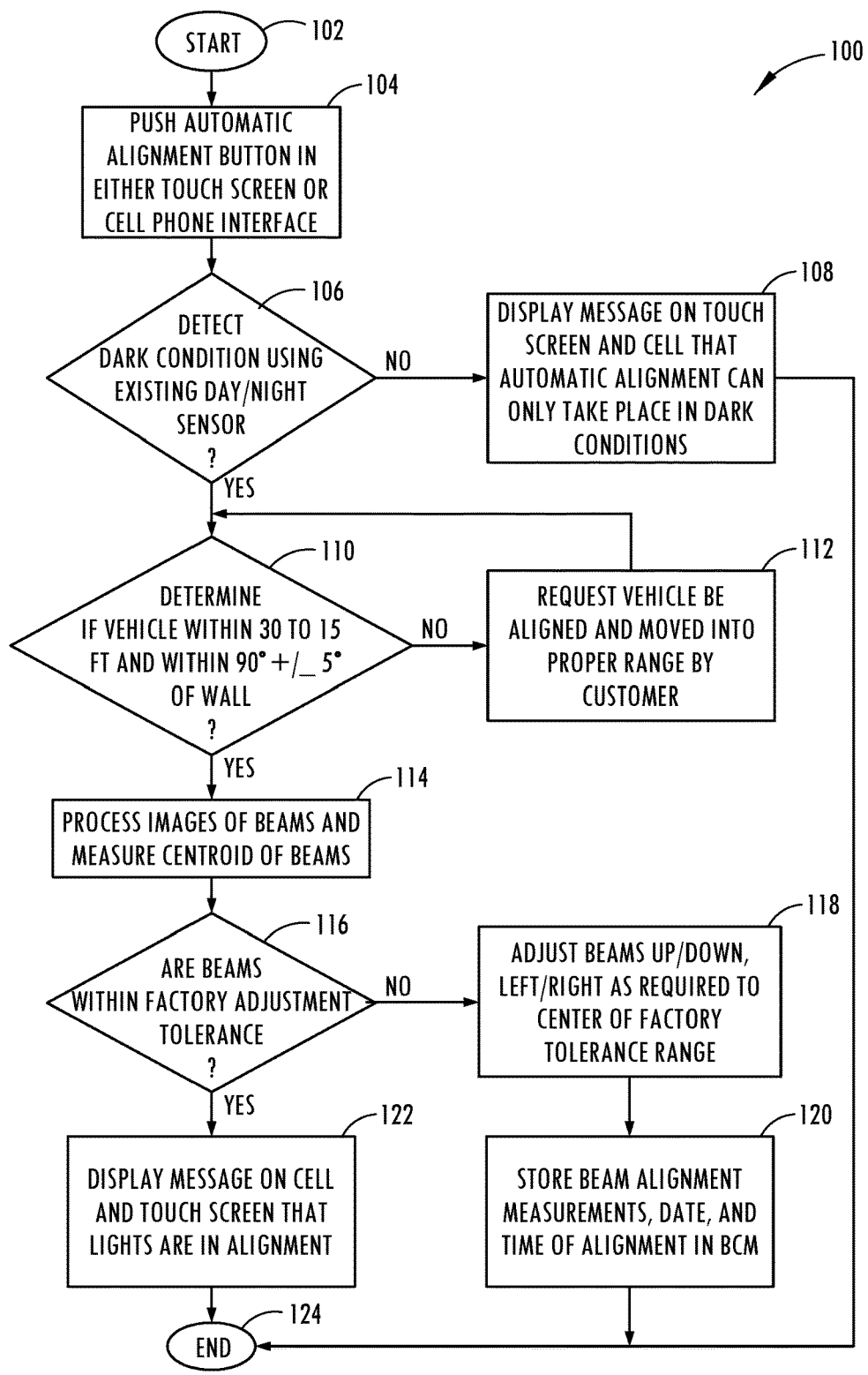
FIG. 8 is a flow diagram illustrating a method for adjusting the vehicle headlamp assembly during the alignment process, according to one embodiment.

Referring to FIG. 8, the beam alignment routine 100 is illustrated, according to one embodiment. Routine 100 begins at step 102 and proceeds to step 104 to detect a user pushing the automatic alignment input button or otherwise entering the beam alignment command with either a touch screen or a cell phone interface. Next, at decision step 106, routine 100 detects a dark (i.e., low light or no light) environment using the day/night sensor. If the environment is not dark, routine 100 proceeds to step 108 to display a message on the touch screen and the cell phone that automatic alignment can only take place at night in dark conditions before ending at step 124. If a dark environment is detected, routine 100 proceeds to decision step 110 to determine if the vehicle is within a predetermined distance of 30 to 15 feet of a wall forward of the vehicle, according to one embodiment, and the vehicle is oriented within an angle of 90°±5° of the wall such that the vehicle is substantially perpendicular to the wall, according to one embodiment. If the vehicle is not within the predetermined distance of the wall or not within the predetermined angle of the wall, routine 100 proceeds to step 112 to request that the vehicle be aligned and moved into proper range by the customer before returning to step 110. If the vehicle is properly aligned within the predetermined distance and angle of the wall, routine 100 proceeds to step 114 to process the images of the headlamp beams and to measure the centroid of the headlamp beams. In decision step 116, routine 100 determines if the beams are within the factory adjustment tolerance and, if so, displays a message on the cell phone and touch screen displays that the headlamps are in alignment at step 122 before ending at step 124. If the beams are determined not to be within the factory adjustment tolerance, routine 100 proceeds to step 118 to move the headlamp to adjust the headlamp beams up or down and/or left or right as required to reach the center of factory tolerance range. This is achieved by activating the adjuster modules containing the actuators for up and down and left and right movement of the headlamp assembly. Thereafter, at step 120, routine 100 stores the beam alignment measurements, the date of the alignment and the time of the alignment in the controller, such as the body control module, before ending at step 124.

Accordingly, the vehicle headlamp alignment system 60 advantageously aligns the headlamps 16 of the vehicle 10 by employing the imaging camera 30 capturing images of the headlamp beam on a surface of a wall forward of the vehicle 10. This enables the headlamps to be aligned to a setpoint easily without any special equipment. Thus, the owner of a vehicle 10 may align the headlamps or a technician or a dealer or repair shop may align the headlamps simply by orienting the vehicle relative to a wall in the dark and processing the images generated by the camera onboard the vehicle.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A vehicle headlamp alignment system comprising:
   a headlamp located on a vehicle;
   an adjuster module for adjusting aim of the headlamp;
   a camera located on the vehicle; and
   a controller processing images acquired by the camera and determining the aim of the headlamp based on a centroid of a headlamp beam while the vehicle is stationary, wherein the controller controls the adjuster module to align the headlamp based on the determined aim.

2. The system of claim 1 further comprising one or more sensors for sensing distance between the vehicle and a surface forward of the vehicle, wherein the headlamp beam projects onto the surface and the camera acquires images of the headlamp beam on the surface.

3. The system of claim 2, wherein the one or more sensors sense when the vehicle is oriented substantially perpendicular to the surface, and wherein the controller determines the headlamp aim when the vehicle is sensed oriented substantially perpendicular to the surface.

4. The system of claim 2, wherein the one or more sensors are located on the vehicle.

5. The system of claim 4, wherein the one or more sensors comprises a radar sensor.

6. The system of claim 4, wherein the one or more sensors comprises a plurality of ultrasonic sensors.

7. The system of claim 1 further comprising a user input for selecting a desired headlamp beam setting.

8. The system of claim 1 further comprising a remote control device for selecting a headlamp aim setting.

9. A vehicle headlamp alignment system comprising:
   an adjuster module for adjusting aim of a headlamp located on a vehicle;
   a camera located on the vehicle; and
   a controller processing images of a headlamp beam projected onto a stationary vertical surface within about 15-30 feet of the vehicle and acquired by the camera and determining the aim of the headlamp based on the images while the vehicle is stationary, wherein the controller controls the adjuster module to align the headlamp based on the determined aim of a centroid of the headlamp beam.

10. The system of claim 9 further comprising one or more sensors located on the vehicle for sensing distance between the vehicle and the stationary vertical surface forward of the vehicle.

11. The system of claim 10, wherein the one or more sensors comprises a radar sensor.

12. The system of claim 10, wherein the one or more sensors comprises a plurality of ultrasonic sensors.

13. The system of claim 10, wherein the one or more sensors sense when the vehicle is oriented substantially perpendicular to the stationary vertical surface, and wherein the controller determines the headlamp aim when the vehicle is sensed oriented substantially perpendicular to the surface.

14. The system of claim 13, wherein the one or more sensors are separate from the camera.

15. The system of claim 9 further comprising a user input for selecting a desired headlamp aim setting.

16. A method of adjusting a vehicle headlamp comprising:
   aligning a vehicle within about 15-30 feet of a stationary vertical surface so that the vehicle headlamp projects a beam onto the stationary vertical surface;

acquiring images of the beam illuminating on the stationary vertical surface with the use of a camera located on the vehicle while the vehicle is stationary;

determining aim of the beam based on a centroid of the beam; and adjusting the headlamp based on the determined aim.

17. The method of claim 16 further comprising one or more sensors for sensing distance between the vehicle and a surface forward of the vehicle.

18. The method of claim 17, wherein the one or more sensors sense when the vehicle is oriented substantially perpendicular to the surface.

* * * * *